United States Patent
Melman (10) Patent No.: US 10,511,473 B2
(45) Date of Patent: *Dec. 17, 2019

(54) PROTECTION SWITCHING (71) Applicant: MARVELL ISRAEL (M.I.S.L) LTD., Yokneam (IL)

(72) Inventor: David Melman, D.N. Bikat Beit Hakerem (IL)

(73) Assignee: MARVELL ISRAEL (M.I.S.L) LTD., Yokneam (IL)

( * ) Notice: Subject to any disclaimer, the term of this patent is extended or adjusted under 35 U.S.C. 154(b) by 0 days.

This patent is subject to a terminal disclaimer.

(21) Appl. No.: 15/632,461

(22) Filed: Jun. 26, 2017

(65) Prior Publication Data

US 2017/0295055 A1 Oct. 12, 2017

Related U.S. Application Data (63) Continuation of application No. 14/570,510, filed on Dec. 15, 2014, now Pat. No. 9,692,670.

(Continued)

(51) Int. Cl.
*H04L 12/24* (2006.01)
*H04L 12/707* (2013.01)
(Continued)

(52) U.S. Cl.
CPC ...... *H04L 41/0668* (2013.01); *H04L 43/0811* (2013.01); *H04L 43/0817* (2013.01);
(Continued)

(58) Field of Classification Search
None
See application file for complete search history.

(56) References Cited

U.S. PATENT DOCUMENTS 7,345,991 B1 * 3/2008 Shabtay ............... H04L 12/2863 370/221
7,467,191 B1 * 12/2008 Wang .................. G06F 11/2092 709/221

(Continued)

FOREIGN PATENT DOCUMENTS

CN 101056257 A 10/2007
CN 101719918 A 6/2010
(Continued)

OTHER PUBLICATIONS

U.S. Appl. No. 13/151,948. Uri Safrai, "Interface Mapping in a Centralized Packet Processor for a Network," filed Jun. 2, 2011.

(Continued)

*Primary Examiner* — Candal Elpenord (57) ABSTRACT

Aspects of the disclosure provide a network switch having a plurality of physical ports, a detector and a packet processing pipeline. Each of plurality of physical ports is associated with one or more network paths in a transport network to transmit/receive traffic of the network paths. The detector is configured to detect loss of continuity (LOC) on the network paths. The packet processing pipeline is configured to identify first two or more logical interfaces mapped to a first network path, determine second two or more logical interfaces mapped to a second network path that is an alternate network path for the first network path, and use the second two or more logical interfaces in forwarding decisions in response to a detection of LOC on the first network path, such that traffic to the first network path is sent to a physical port associated with the second network path.

18 Claims, 5 Drawing Sheets

Related U.S. Application Data (60) Provisional application No. 61/952,790, filed on Mar. 13, 2014, provisional application No. 61/915,798, filed on Dec. 13, 2013.

(51) Int. Cl.
   *H04L 12/26* (2006.01)
   *H04L 12/723* (2013.01)
   *H04L 12/709* (2013.01)
   *H04L 12/703* (2013.01)

(52) U.S. Cl.
   CPC ............ *H04L 43/10* (2013.01); *H04L 45/22* (2013.01); *H04L 45/50* (2013.01); *H04L 45/245* (2013.01); *H04L 45/28* (2013.01)

(56) References Cited

U.S. PATENT DOCUMENTS

| | | |
|---|---|---|
| 7,675,848 B2 * | 3/2010 | Vasseur ............ H04L 45/02 370/216 |
| 7,796,594 B2 | 9/2010 | Melman et al. |
| 7,961,602 B2 | 6/2011 | Tochio |
| 8,089,963 B2 | 1/2012 | Melman et al. |
| 8,213,296 B2 | 7/2012 | Shannon |
| 8,229,705 B1 | 7/2012 | Mizrahi et al. |
| 8,625,594 B2 | 1/2014 | Safrai et al. |
| 8,660,120 B2 | 2/2014 | Melman et al. |
| 8,804,733 B1 | 8/2014 | Safrai et al. |
| 8,830,841 B1 | 9/2014 | Mizrahi et al. |
| 2006/0251074 A1 | 11/2006 | Solomon |
| 2008/0112323 A1 | 5/2008 | Agmon |
| 2008/0253295 A1 | 10/2008 | Yumoto |
| 2010/0290469 A1 | 11/2010 | Assarpour |
| 2012/0033541 A1 | 2/2012 | Jacob Da Silva |
| 2012/0113835 A1 * | 5/2012 | Alon ............ H04L 43/0817 370/252 |
| 2013/0039169 A1 | 2/2013 | Schlansker |
| 2013/0329547 A1 | 12/2013 | Takase |
| 2014/0099097 A1 | 4/2014 | Zheng |

FOREIGN PATENT DOCUMENTS

| | | |
|---|---|---|
| CN | 101888331 A | 11/2010 |
| CN | 102215124 A | 10/2011 |
| CN | 103098424 A | 5/2013 |
| WO | WO 2013/48303 A1 | 10/2013 |

OTHER PUBLICATIONS

Combined Office Action and Search Report dated Jul. 30, 2018 in Chinese Patent Application No. 201410858278.2 (with English translation of categories of cited documents), citing documents AO-AT therein, 11 pages.

Office Action dated Feb. 15, 2019 in Chinese Patent Application No. 201410858278.2 with English translation.

CN Application No. 201410858278.2, Third Office Action, dated Aug. 5, 2019, 9 pages, including English translation.

* cited by examiner

PROTECTION SWITCHING

INCORPORATION BY REFERENCE

This application is a continuation of U.S. application Ser. No. 14/570,510, filed Dec. 15, 2014, which claims the benefit of U.S. Provisional Application No. 61/915,798, "Protection Switching" filed on Dec. 13, 2013 and U.S. Provisional Application No. 61/952,790, "Protection Switching" filed on Mar. 13, 2014. The disclosures of the applications referenced above are incorporated herein by reference in their entireties.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Protection switching is used in a network to increase network reliability and to improve resilience to network failure. In a protection switching example, two network nodes are coupled by a working path and a protection path. When the working path is defective, the protection path is used to transmit traffic between the two network nodes.

SUMMARY

Aspects of the disclosure provide a network switch having a plurality of physical ports, a detector and a packet processing pipeline. Each of plurality of physical ports is associated with one or more network paths in a transport network to transmit/receive traffic of the network paths. The detector is configured to detect loss of continuity (LOC) on the network paths. The packet processing pipeline is configured to identify first two or more logical interfaces mapped to a first network path, determine second two or more logical interfaces mapped to a second network path that is an alternate network path for the first network path, and use the second two or more logical interfaces in forwarding decisions in response to a detection of LOC on the first network path, such that traffic to the first network path is sent to a physical port associated with the second network path.

In an embodiment, the packet processing pipeline includes an operation, administration and maintenance (OAM) engine to detect LOC on the network paths. The LOC status may be set by hardware OAM engine when keep-alive messages are not received in for the configured time period, or the LOC status may be set by management software. In an example, the packet processing pipeline is configured to map the first two or more logical interfaces to an entry in a LOC table that is indicative of an LOC detection status of the first network path, and the packet processing pipeline is configured to update the entry in the LOC table when a LOC on the first network path is detected.

According to an aspect of the disclosure, the packet processing pipeline is configured to determine to use the first two or more logical interfaces mapped to the first network path or to use the second two or more logical interfaces mapped to the second network path in the forwarding decisions based on the entry in the LOC table that is indicative of the LOC detection status of the first network path.

In an embodiment, when a protection switching service is a 1:1 protection switching service, the packet processing pipeline includes a forwarding engine configured to determine to use one of the first two or more logical interfaces mapped to the first network path or to use one of the second two or more logical interfaces mapped to the second network path in the forwarding decisions in order to deliver traffic in the protection switching service to one of the first network path and the second network path. In another embodiment, when the protection switching service is a 1+1 protection switching service, the forward engine is configured to use a multi-target logical interface in the forwarding decisions in order to deliver traffic to both the first network path and the second network path.

According to an aspect of the disclosure, the packet processing pipeline is configured to receive traffic from one of the first network path and the second network path based on the entry in the LOC table that is indicative of the LOC detection status of the first network path. In an embodiment, the packet processing pipeline is configured to assign a logical interface mapped to a network path to a packet when the packet is received from the network path, and drop the packet when an entry in the LOC table indicates that LOC is detected on the network path to which the logical interface is mapped. In an example, in the event that the target logical interface indicates LOC, then the least significant bit of the target logical interface index is toggled such that the packet is forwarded to a new target logical interface. For example, if the packet is assigned a target logical interface index 100 in binary, and this logical interface indicates LOC, then the packet is forwarded to the new target logical interface index 101 in binary. In an example, the packet processing pipeline is configured to assign consecutive indexes of logical interfaces to the first network path and the second network path in a protection switching service and XOR the index of the logical interface to the first network switch with the entry in the table to determine a target logical interface in a forwarding decision.

Aspects of the disclosure provide a method for network communication. The method includes detecting loss of continuity (LOC) on a first network path associated with a first physical port of a network switch. The network switch has a plurality of physical ports each of which is associated with one or more network paths in a transport network to transmit/receive traffic of the network paths. Further, the method includes identifying first two or more logical interfaces mapped to the first network path in the transport network, determining second two or more logical interfaces mapped to a second network path that is an alternate network path for the first network path, and using the second two or more logical interfaces in forwarding decisions, such that traffic to the first network path is sent to a second physical port associated with the second network path in response to a detection of LOC on the first network path.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
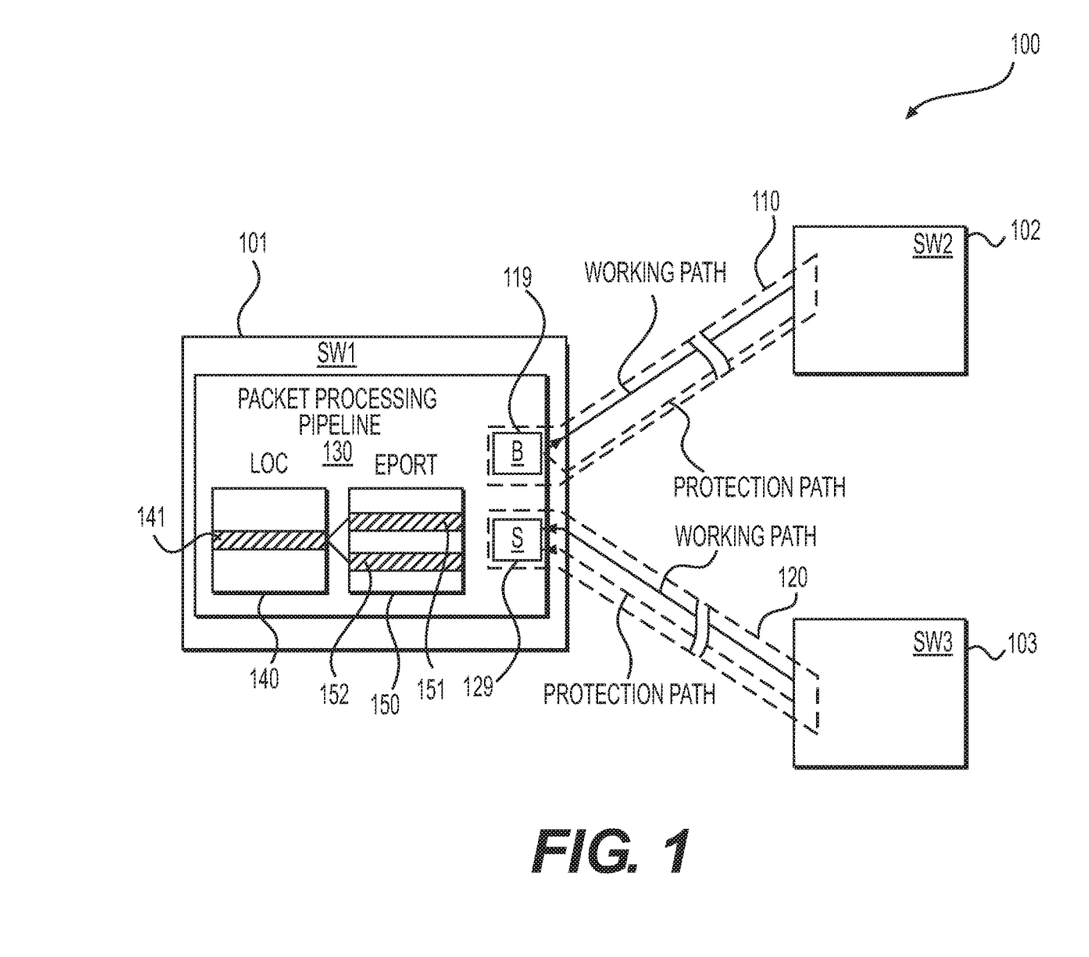
FIG. 1 shows a diagram of a network system 100 using protection switching according to an embodiment of the disclosure.

FIG. 1 shows a network system 100 according to an embodiment of the disclosure. A portion of the network system 100, such as network switches 101-103, and the like is configured to enable protection switching for transporting datagrams, such as transporting packets, data frames, and the like. At least one of the network switches, such as the network switch 101, and the like is configured to enable a fast switching, such as in less than 50 ms, from a working path to a protection path when a network failure on the working path is detected.

The network system 100 can be any suitable network system. For example, the network system 100 can be a single network or a plurality of networks of the same or different types. In an example, the network system 100 includes a local telephone network in connection with a long distance telephone network. Further, in another example, the network system 100 is a data network or a telecommunications or video distribution (e.g. cable, terrestrial broadcast, or satellite) network in connection with a data network. Any combination of telecommunications, video/audio distribution and data networks, whether a wired, wireless, optical, global, national, regional, wide-area, local area, or in-home network, may be used without departing from the spirit and scope of the present disclosure.

In an embodiment, the network system 100 includes a multi-protocol label switching (MPLS) network in which the network switches 101-103 are label switch routers configured to route packets according to labels. In an example, the network switches 101-103 are respectively label edge routers that each sits at an edge of the MPLS network neighboring to a local area network (not shown) to act as a gateway between the local area network (LAN) and the MPLS network. In an example, the MPLS network is a wider area network or the Internet. The MPLS network includes other label switch routers (not shown) coupled to the network switches 101-103 in the MPLS network.

In the example, the network switches 101-103 handle the entrance and exit of information to the MPLS network. For example, when the network switch 101 receives packets from a LAN and forwards packets into the MPLS network, the network switch 101 uses routing information to determine appropriate labels to be affixed, labels the packets accordingly, and then forwards the labelled packets into the MPLS network. When the network switch 101 receives a labelled packet which is destined to exit the MPLS network, the network switch 101 strips off the label and forwards the resulting packet using, for example, normal IP forwarding rules.

In another embodiment, the network system 100 includes a virtual local area network (VLAN) based Ethernet network in which the network switches 101-103 are Ethernet switches configured to route packets according to VLAN identification. In an example, the network switches 101-103 are respectively end switches that each connects one or more terminal electronic devices (not shown), such as desktop computers, printers, and the like, to the Ethernet network. The Ethernet network includes other Ethernet switches (not shown) coupled with the network switches 101-103 in the Ethernet network.

In the example, the network switches 101-103 handle the entrance and exit of information to the Ethernet network. For example, when the network switch 101 receives a packet from a terminal electronic device, and forwards the packet into the Ethernet network, the network switch 101 uses routing information to determine appropriate VLAN identification (ID) to be affixed, includes the VLAN ID in the packet accordingly, and then forwards the packet with the VLAN ID into the Ethernet network.

According to an aspect of the disclosure, the network system 100 is configured to provide protection switching services to increase network reliability and to improve resilience to network failure. For example, the network system 100 is configured to provide a protection switching service 110 between the network switch 101 and the network switch 102, and provide a protection switching service 120 between the network switch 101 and 103.

Specifically, the protection switching service 110 includes a working path and a protection path that inter-connect the network switch 101 and the network switch 102 in parallel. The working path includes one or more network switches (not shown) coupled in serial series between the network switch 101 and the network switch 102, and each of the network switches is configured to receive packets from a previous network switch, process the packets and forward the packets to a next network switch on the working path. The protection path includes one or more network switches (not shown) coupled in serial series between the network switch 101 and the network switch 102, and each of the network switches is configured to receive packets from a previous network switch, process the packets and forward the packets to a next network switch on the protection path.

In an example, the protection switching service 110 belongs to a MILS network. The network switch 101 is configured to affix a specific label to packets in a flow. The network switches on the working path are configured to store the specific label in associated with a next switch on the working path for packet forwarding. Then when a network switch on the working path receives a packet from a previous network switch, the network switch label-switches the packet and forwards the packet to a next network switch on the working path according to the label.

Similarly, the network switches on the protection path are configured to store the specific label in associated with a next switch on the protection path for packet forwarding. Then when a network switch on the protection path receives a packet from a previous network switch, the network switch learns a label from label switches the packet and forwards the packet to a next network switch on the protection path according to the label.

The protection switching service 120 also includes a working path and a protection path that inter-connect the network switch 101 and the network switch 103 in parallel. The working path includes one or more network switches (not shown) coupled in serial series between the network switch 101 and the network switch 103, and each of the network switches is configured to receive packets from a previous network switch, process the packets and forward the packets to a next network switch on the working path. The protection path includes one or more network switches (not shown) coupled in series between the network switch 101 and the network switch 103, and each of the network switches is configured to receive packets from a previous network switch, process the packets and forward the packets to a next network switch on the protection path.

In an example, the protection switching service 110 belongs to a VLAN based Ethernet network. The network switch 101 is configured to affix a specific VLAN ID to packets in a flow. The network switches on the working path are configured to store the specific VLAN ID in association with port membership for packet forwarding. Then when a network switch on the working path receives a packet from a previous network switch, the network switch switches the packet and forwards the packet on the working path according to the VLAN ID and the port membership.

Similarly, the network switches on the protection path are configured to store the specific VLAN ID in association with port membership for packet forwarding. Then when a network switch on the protection path receives a packet from a previous network switch, the network switch switches the packet and forwards the packet to a next network switch on the protection path according to the VLAN ID and the port membership.

The protection switching service 120 also includes a working path and a protection path that inter-connect the network switch 101 and the network switch 103 in parallel. The working path includes one or more network switches (not shown) coupled in series between the network switch 101 and the network switch 103, and each of the network switches is configured to receive packets from a previous network switch, process the packets and forward the packets to a next network switch on the working path. The protection path includes one or more network switches (not shown) coupled in serial between the network switch 101 and the network switch 103, and each of the network switches is configured to receive packets from a previous network switch, process the packets and forward the packets to a next network switch on the protection path.

It is noted that, in an example, the network switches on the working paths and the protection paths are label switch routers configured to forward traffic according to labels. In another example, the network switches on the working paths and the protection paths are Ethernet switches that are configured to be able to forward traffic according to VLAN identifications as well as other information, such as port membership information, and the like.

It is also noted that, in an embodiment, the network system 100 is configured to suitably allocate resources to the working path and the corresponding protection path in a protection switching service, such that the protection path has about the same transmission properties, such as bandwidth, and the like as the corresponding working path.

Further, the network switches 101-103 are configured to be able to switch from one path to the other path in a protection switching service. Specifically, in the FIG. 1 example, the network switch 101 includes a packet processing pipeline 130 for packet processing. The packet processing pipeline 130 is configured to use logical ports in forwarding decisions, and packet forward is conducted based on mapping of the logical ports to physical ports. The network switch 101 includes physical ports (not shown) associated with network paths. Each of the physical ports corresponds to one or more logical ports. In an example, the network switch 101 includes a mapper (not shown) configured to map physical ports to logical ports. According to an aspect of the disclosure, forwarding decisions are decoupled from the physical ports. When loss of continuity LOC is detected on a network path, forwarding decisions are updated at fast speed. Traffic is rerouted over different network path based on mapping between the logical ports and the physical ports.

In the FIG. 1 example, the packet processing pipeline 130 includes a first processing portion 119 configured to act as an egress bridge to direct packets to the working path and/or the protection path of the protection switching service 110. In an example, a first logical port representing the protection switching service 110 is determined in a forwarding decision for a packet. For example, when attributes of the first logical port indicates that the protection switching service 110 is a 1+1 protection switching service, the first processing portion 119 determines a multi-target ePort corresponding to both physical ports associated with the working path and the protection path in the protection switching service 110. The packet is replicated, and the replicated packets are egressed from the physical ports associated with both the working path and the protection path of the protection switching service. When attributes of the first logical port indicates that the protection switching service 110 is a 1:1 protection switching service, the first processing portion 119 determines that the first logical port corresponding to a first physical port associated with the working path is the target logical port to forward the packet when loss of continuity (LOC) is not detected on the working path, and determines that a second logical port corresponding to a second physical port associated with the protection path is the target logical port to forward the packet. Thus, the packet is egressed from the first physical port when LOC is not detected on the working path and is egressed from the second physical port when LOC is detected on the working path.

Further, in the FIG. 1 example, the network switch 101 receives packets from the network switch 103 using the protection switching service 120. The packet processing pipeline 130 includes a second processing portion 129 configured to act as an ingress selector to select one of the working path and the protection path to receive packets. For example, the second processing portion 129 is configured to select the working path at default to receive packets; and is configured to select the protection path when an LOC is detected on the working path. In an embodiment, the second processing portion 129 assigned a logical port to a packet based on a physical port from which the packet is received and other information, such as a portion in the header of the packet that indicates information of the protection switching service. Then second processing portion 129 classifies the packet to have arrived on working path or protection path. For example, the second processing portion 129 sets a path flag to binary "1" to indicate that the packet is received from a protection path and set the path flag to binary "0" to indicate that the packet is received from a working path. Then, the second processing portion 129 filters the packet according to the path flag and the LOC detection. For example, when LOC is not detected on the working path, and the path flag is binary "1", the packet is dropped; and when the LOC is detected on the working path, and the path flag is binary "0", the packet is dropped.

Further, according to an aspect of the disclosure, a network switch 101 employing logical port interfaces for packet processing is configured to enable fast switching of all traffic from a working path to a corresponding protection path when an LOC is detected on the working path. In an embodiment, the network switch 101 is configured to allocate a logical port (ePort) to represent a protection switching service for each flow of packets and to map logical ports for a plurality of flows that uses the same protection switching service to a status of the working path in the protection switching service. In an example, the status of the working path is stored in an entry of a data structure, such as an entry of a hardware table, and the like. The entry value is indicative of an LOC status for the working path in the protection switching service. When an LOC is detected on the working path, the entry value is updated to indicate that the working path is defective. The update of the entry value then causes all the logical ports that are mapped to the entry to switch to the protection path at a fast speed, such as in less than 50 ms.

According to an aspect of the disclosure, the packet processing pipeline 130 includes an LOC table 140 to maintain statuses of working paths of the protection switching services in the network system 100. In an example, an entry 141 in the LOC table keeps an LOC status of the working path in the protection switching service 110. For example, logic value "0" in the entry 141 is indicative of a normal operating (e.g., without LOC being detected) of the working path in the protection switching service 110; and logic value "1" in the entry 141 is indicative of an LOC being detected on the working path in the protection switching service 110.

Further, the packet processing pipeline 130 includes an ePort table 150 to maintain a mapping of traffic flows of the protection switching services to the LOC statuses of the working paths in the protection switching services. For example, there are two MPLS services, namely service X and service Y, that are transported over the same MPLS tunnel as the MPLS tunnel switching service 110. Tunnel OAM is used to detect LOC over the tunnel transport. The MPLS tunnel switching service 110 is used to transport service X and service Y packets from the network switch 101 to the network switch 102. Service X packets are assigned target ePort 151, which maps to the LOC table status entry 141 which reflects the LOC status of the MPLS tunnel. Service Y packets are assigned target ePort 152, which also maps to the LOC table status entry 141.

Further, when the protection switching service 110 is a 1:1 type protection switching service and an LOC is detected on the working path, the entry 141 changes from logic "0" to logic "1". The value change causes the first processing portion 119 to direct both service X packets in the first flow and service Y packets to the protection path (i.e. a different MPLS tunnel) of the protection switching service 110.

It is noted that the LOC can be detected using any suitable technique, such as a hardware based LOC detection, a software based detection, communication from another device informing the LOC detection, and the like.

It is also noted that the packet processing pipeline 130 can be implemented using any suitable technique. In an example, the packet processing pipeline 130 is implemented using circuits. In another example, the packet processing pipeline 130 is implemented in a processor.

Figure 2:
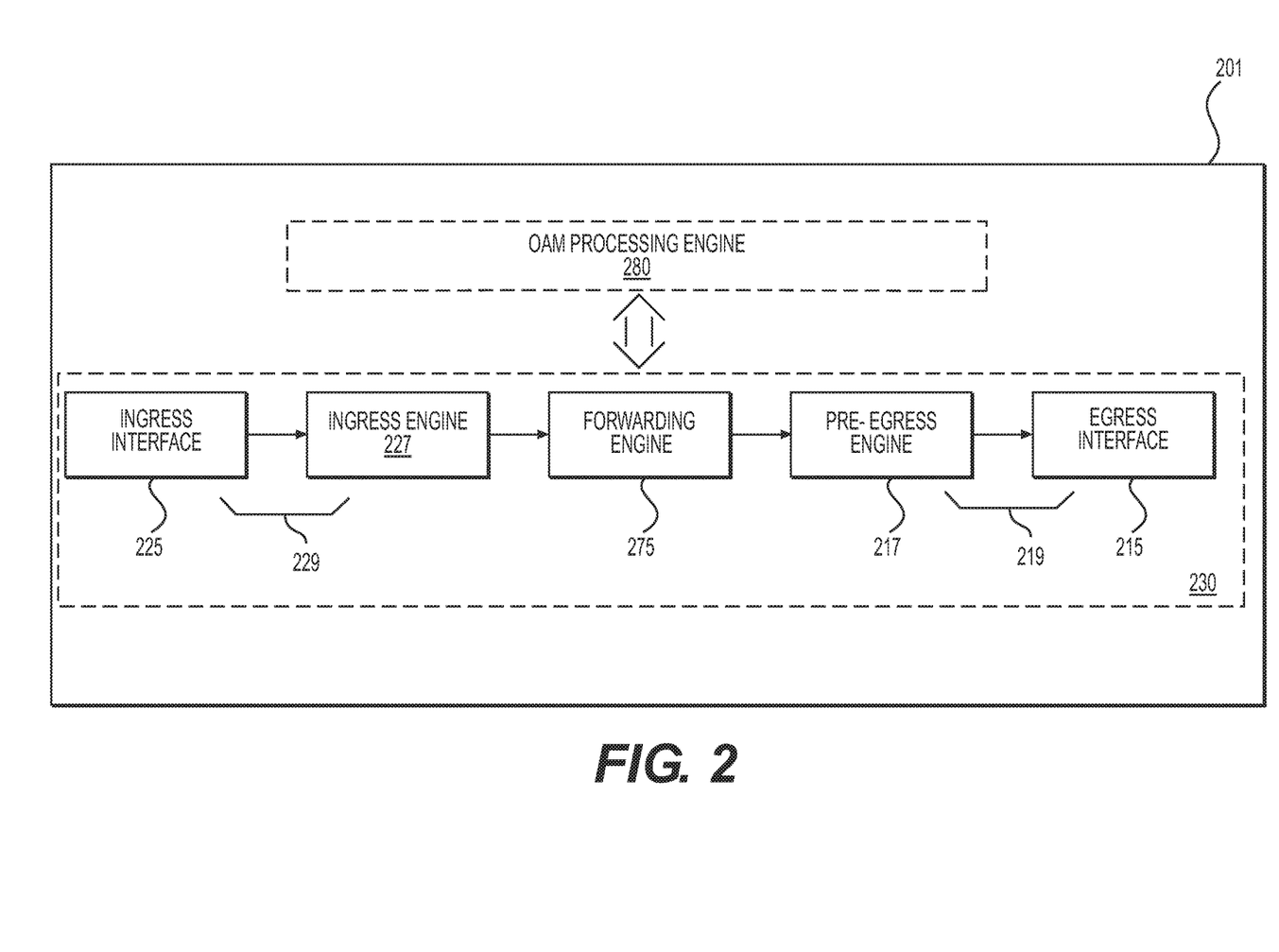
FIG. 2 shows a block diagram of a network switch 201 for protection switching according to an embodiment of the disclosure.

FIG. 2 shows a block diagram of a network switch 201 according to an embodiment of the disclosure. In an example, the network switch 201 is used in the network system 100 as the network switch 101. The network switch 201 includes a packet processing pipeline 230. The packet processing pipeline 230 includes a first processing portion 219 formed of a pre-egress engine 217 and an egress interface 215, a second processing portion 229 formed of an ingress interface 225, and an ingress engine 227, and a forwarding engine 275. In an embodiment, the network switch 201 includes an OAM processing engine 280 configured to detect LOC and the LOC information can be used by the packet processing pipeline 230 in forwarding decisions. The OAM processing engine 280 can be a part of the packet processing pipeline 230 or can be separate from the packet processing pipeline 230. These elements are coupled together as shown in FIG. 2, in an embodiment.

The ingress interface 225 includes any suitable hardware and/or software components, such as receiving circuits, physical ingress ports, and the like configured to receive packets coming into the network switch 201. The egress interface 215 includes any suitable hardware and/or software components, such as transmitting circuits, physical egress ports, and the like configured to transmit packets out of the network switch 201.

The ingress engine 227 classifies and filters the received packets. In an example, when the ingress interface 225 receives a packet in a flow coining into the network switching 201 from a path in a protection switching service, the ingress engine 227 assigns an ePort representing the protection switching service for the flow to the packet. Further, the ingress engine 227 filters the packet according to the path from which the packet is received and the LOC status of the working path in the protection switching service.

According to an aspect of the disclosure, the packet processing pipeline 230 includes a data structure for keeping LOC status of the working paths. In an example, the packet processing pipeline 230 includes an LOC table for keeping the LOC status of the working paths. The LOC status of the working paths can be detected using any suitable technique. In an example, the OAM processing engine 280 uses a keep-alive aging technique to detect the LOC status of a working path. Examples of standard keep-alive messages are IEEE 802.1ag Connectivity Check Messages (CCMs), and IETF Bidirection Forwarding Detection (BFD). In another example, the OAM processing engine 280 receives a LOC status of a working path from another network switch.

In an example, when the LOC status of the working path in the protection switching service is normal without LOC being detected, and the packet comes into the network switch 201 from the working path, the packet is kept for further processing. When the LOC status of the working path in the protection switching service is normal without LOC being detected, and the packet comes into the network switch 201 from the protection path, the packet is dropped. When LOC is detected on the working path in the protection switching service, and the packet comes into the network switch 201 from the working path, the packet is dropped. When LOC is detected on the working path in the protection switching service, and the packet comes into the network switch 201 from the protection path, the packet is kept for further processing.

The forwarding engine 275 makes forward decisions for packets. The forwarding engine 275 processes packets and makes a forwarding decision according to any suitable protocol. In an example, the forwarding engine 275 receives a packet coming from a protection switching service, processes the packet and makes decision to forward the packet to an LAN for example. In another example, the forwarding engine 275 receives a packet from an LAN, and makes decision to forward the packet to a remote LAN via MPLS. In an embodiment, the forwarding engine 275 makes forwarding decisions using ePorts. In an example, when the packet is destined to a protected service, the forwarding engine 275 forwards the packet to an ePort that has been assigned to the flow for the given protection switching service.

In an embodiment, the pre-egress engine 217 maps ePorts to physical ports in the egress interface 215. When the forwarding engine 275 makes a forwarding decision based an ePort, the pre-egress engine 217 then directs the packet to the appropriate physical ports in the egress interface 215 based on the a mapping of the logical ePort to a physical port, protection switching service type and the LOC status of the working path associated with the physical port in the protection switching service. In an example, when the destination is a 1+1 protection switching service, the forwarding engine 275 assigns a multi-target ePort that triggers the multicast replication engine (not shown) to replicate the packet to two target ePorts, each of which is mapped to a logical interface (e.g. MPLS pseudowire) and a physical ports in the egress interface 215. The two physical ports are respectively the entrance of the working path and the protection path for the protection switching service.

In another example, when the protection switching service type is 1:1 protection service, and the working path has no LOC detection (e.g., logic "0" in the entry of the LOC table), a forwarding decision is made to forward the packet to the ePort of the working path (i.e. this is the same ePort assigned by the forwarding engine 275); and when LOC is detected on the working path (e.g., logic "1" in the entry of the LOC table), the pre-egress engine 217 updates a forwarding decision to forward the packet to the ePort of the protection path. The ePort of the protection path is determined by toggling the least significant bit of the ePort of the working path, in an embodiment.

In an embodiment, an ePort with an index N (N is a positive integer in an example) is assigned to a protection switching service, the ePort is mapped to a logical interface and physical port that is the entrance of the working path of the protection switching service. Further, an ePort with an index N+1 is mapped to a logical interface and to the physical port that is the entrance of the protection path of the protection switching service. Thus, in an example, when LOC is detected on the working path, the packet processing pipeline 230 updates the index of the mapping ePort (e.g., toggling the least significant bit from '0' to '1'). Then, the packet is forwarded to the physical port that is the entrance of the protection path. In an example, the packet processing pipeline 230 includes a XOR logic circuit to combine the index of the initially assigned ePort in the forwarding decision with the LOC entry value of the working path to calculate the index of the mapping ePort. The packet is then forwarded to the physical port of the mapping ePort. Thus, packet forwarding is executed at hardware speed.

Figure 3:
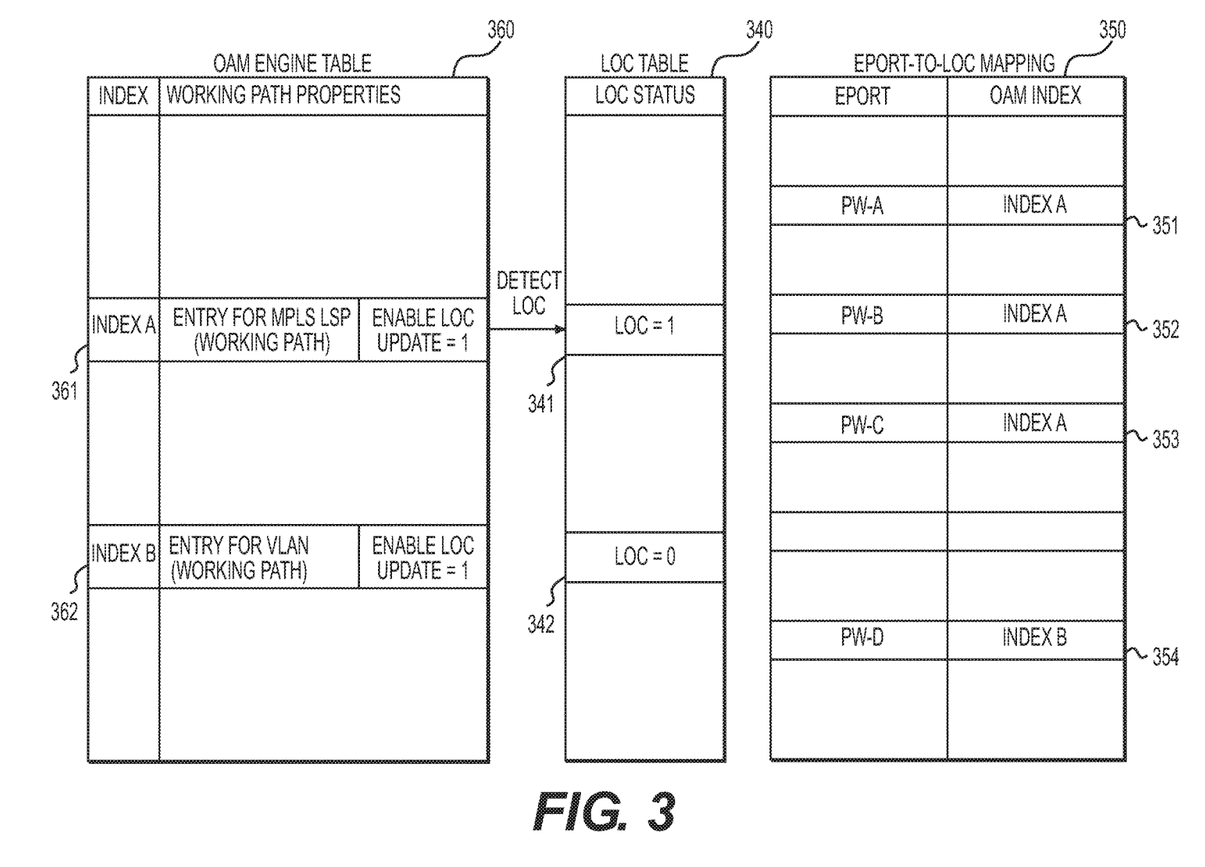
FIG. 3 shows a diagram of a packet processing pipeline 330 according to an embodiment of the disclosure.

FIG. 3 shows a diagram of tables according to an embodiment of the disclosure. The diagram includes an OAM engine table 360 to keep path properties, an LOC table 340 to keep LOC status of working paths in protection switching services, and an ePort-to-LOC mapping table 350 to map the ePort of a working path to its associated LOC status.

Specifically, in the FIG. 3 example, the OAM engine table 360 includes a plurality of entries that in which each entry has an index and stores properties for a working path. For example, entry 361 has index A and stores properties for a working path in an MPLS type protection switching service; and entry 362 has index B and stores properties for a working path in a VLAN type protection switching service. In an example, one of the properties is a flag indicating whether the working path is enabled to update the LOC status. For example, when the flag is "1", the working path is enabled to update the LOC status; and when the flag is "0", the working path is disabled from updating the LOC status.

Further, each working path in the OAM engine table 360 has a corresponding LOC entry in the LOC table 340 to keep the LOC status of the working path. In the FIG. 3 example, entry 341 in the LOC table 340 keeps the LOC status of the working path in the entry 361; and entry 342 in the LOC table 340 keeps the LOC status of the working path in the entry 362. For example, when loss of continuity is not detected on a working path, the corresponding LOC entry is logic "0" (e.g., the entry 342), and when LOC is detected on a working path, the corresponding LOC entry is logic "1" (e.g., entry 341).

The ePort-to-LOC mapping table 350 includes a plurality of entries that map the working path ePorts to its associated LOC status. In an embodiment, an ePort (e.g., a protection switching service for a flow of packets) is emulated as a pseudowire (PW) to tunnel over a packet switching network. Thus, a protection switching service for a PW flow of packets is assigned an OAM table index which is used to index the OAM engine table 360. For example, entry 351 maps the ePort assigned to PW-A to the index A of the OAM engine table 360; entry 352 maps the ePort assigned to PW-B to the index A of the OAM engine table 360; entry 353 maps the ePort assigned to PW-C to the index A of the OAM engine table 360; and entry 354 maps the ePort assigned to PW-D to the index B of the OAM engine table 360.

In the FIG. 3 example, the respective ePorts for pseudowires PW-A, PW-B and PW-C are mapped to the index A of the OAM engine table 360. When LOC is detected on the working path in the index A of the OAM engine table 360, the LOC status for the working path is changed to logic "10" as shown by 341. The LOC status change causes the flows on the pseudowires PW-A, PW-B and PW-C switch at hardware speed (e.g., using a XOR gate) to the protection path of the protection switching service.

It is noted that the table structure in the OAM engine 330 can be suitably modified. In an example, the LOC table 340 is integrated with the OAM engine table 360. For example, the properties of a working path include a LOC status for the working path.

Figure 4:
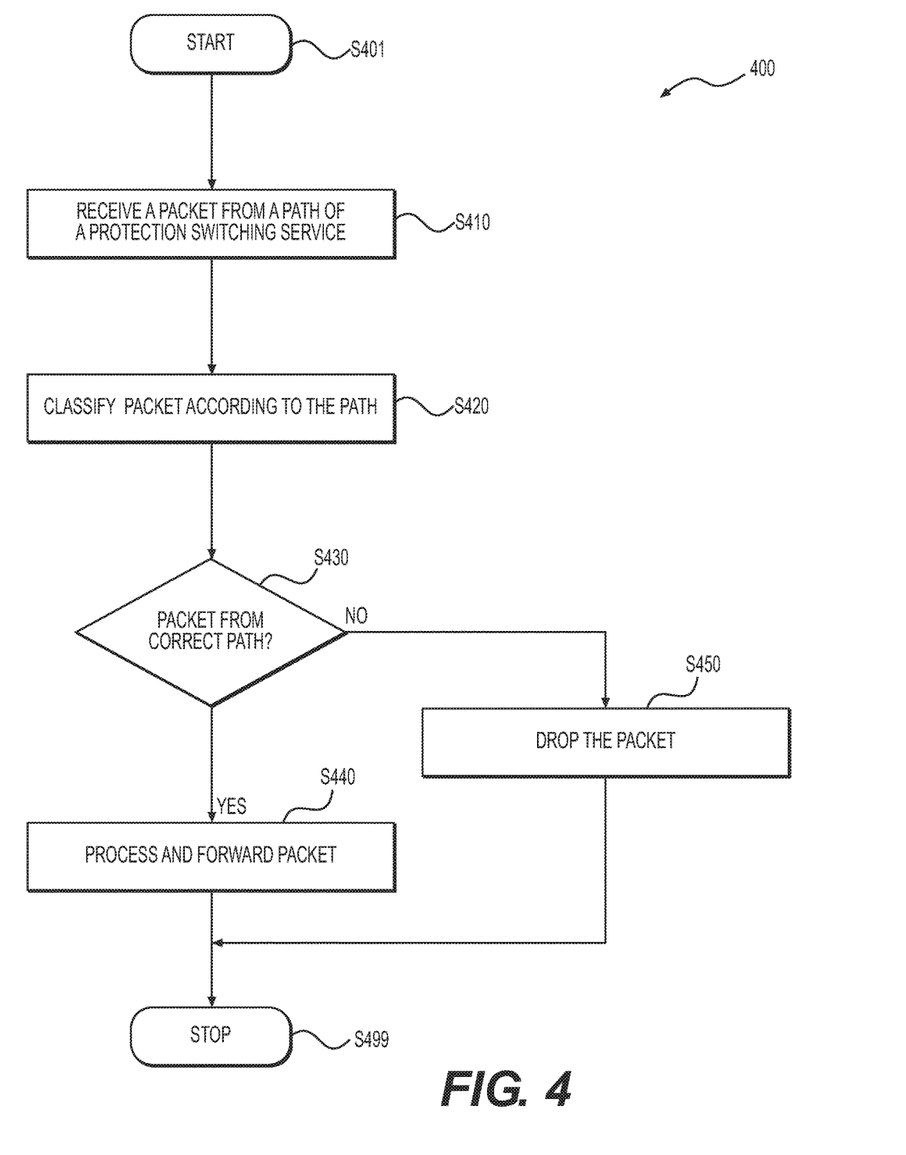
FIG. 4 shows a flow chart outlining a process 400 for receiving packets from protection switching service according to an embodiment of the disclosure.

FIG. 4 shows a flow chart outlining a process 400 for receiving a packet according to an embodiment of the disclosure. In the FIG. 1 example, the process 400 is executed in the network switch 101 by the second processing portion 129. The process starts at S401, and proceeds to S410.

At S410, a packet is received by a network switch from a path in a protection switching service. In the FIG. 1 example, the network switch 101 receives a packet from the protection switching service 120. The protection switching service 120 includes a working path and a protection path.

At S420, the packet is classified according to the path from which the packet is received. For example, when the packet is received from the working path, the packet is classified as coming from the working path, and when the packet is received from the protection path, the packet is classified as coming from the protection path. In an example, the ingress processing portion 129 assigned a logical port to a packet based on a physical port from which the packet is received and other information, such as protection service information in the header of the packet. Then the ingress processing portion 129 classifies the packet to have arrived on working path or protection path. For example, the ingress processing portion 129 sets a path flag to binary "1" to indicate that the packet is received from a protection path and set the path flag to binary "0" to indicate that the packet is received from a working path.

At S430, the network switch determines whether the packet is received from the correct path. For example the network switch 101 determines whether the packet is received from the correct path according to the LOC status of the working path. For example, when the working path does not have LOC indication, and the packet comes from the working path, the packet is received from the correct path; when the working path does not have LOC indication, and the packet comes from the protection path, the packet is received from an incorrect path; when LOC is detected on the working path, and the packet is received from the working path, the packet is received from an incorrect path; and when the LOC is detected on the working path, and the packet is received from the protection path, the packet is received from the correct path. When the packet is received from the correct path, the process proceeds to S440; otherwise, the process proceeds to S450.

At S440, the packet is processed and forwarded to another device. In an example, a forwarding engine, such as the forwarding engine 275 and the like, makes forwarding decisions of an ePort to forward the packet. Then, another processing portion, such as the pre-egress engine 217, determines a physical port corresponding to the ePort to send the packet to the other device. Then, the process proceeds to S499 and terminate.

At S450 the packet is dropped due to the incorrect path, and the process proceeds to S499 and terminates.

Figure 5:
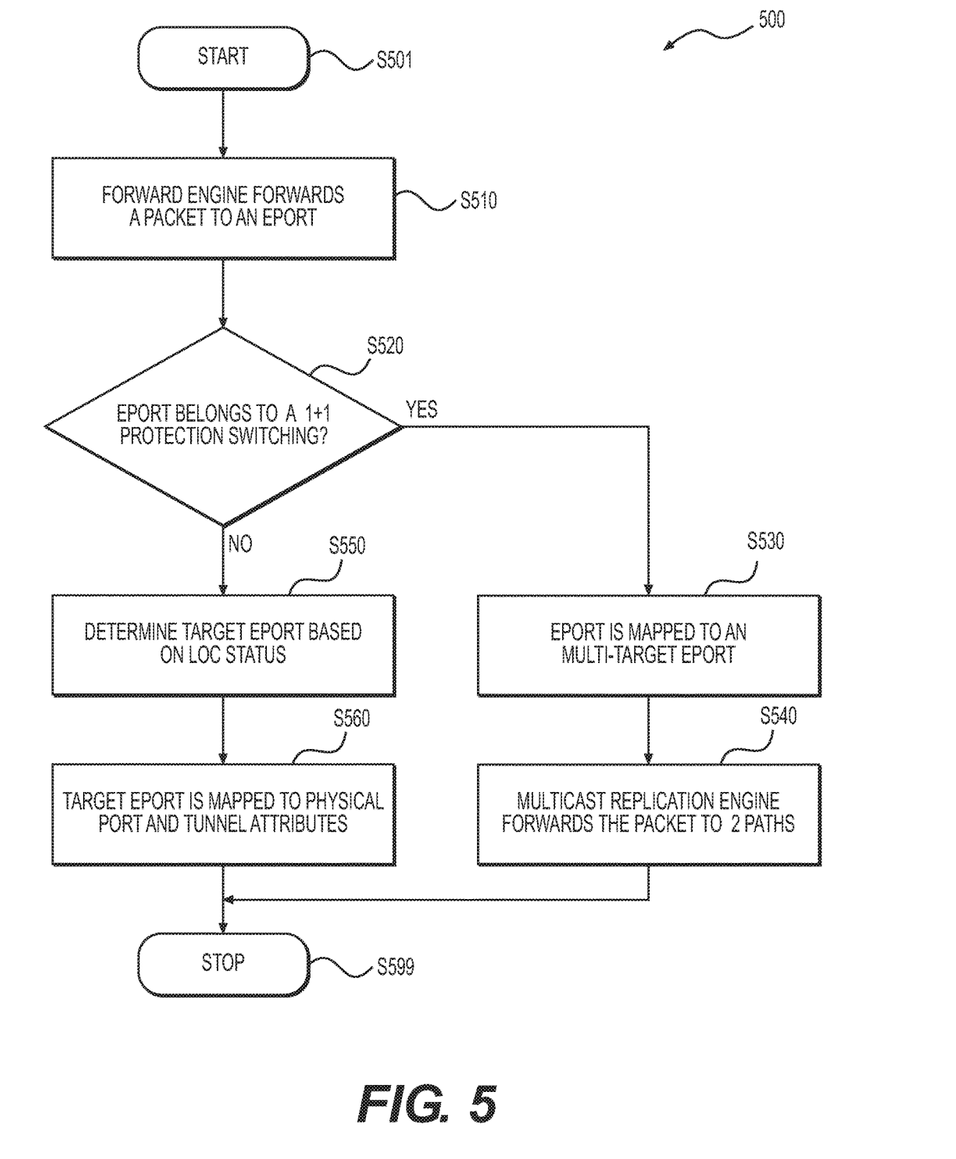
FIG. 5 shows a flow chart outlining a process 500 for transmitting packets to protection switching service according to an embodiment of the disclosure.

FIG. 5 shows a flow chart outlining a process 500 for transmitting a packet according to an embodiment of the disclosure. In the FIG. 1 example, the process 500 is executed by the first processing portion 119 in the network switch 101. The process starts at S501, and proceeds to S510.

At S510, a forwarding engine makes a forwarding decision to forward a packet to an ePort. In the FIG. 1 example, the network switch 101 receives a packet from a first network and the packet is destined to a second network via the protection switching service 110; for example. The network switch 101 forwards the packet to physical port corresponding to the protection switching service 110, based on a mapping between the ePort and the physical port.

At S520, the process branches according to the type of protection switching service to which the ePort is allocated. For example, when the protection switching service 110 is a 1+1 type of protection switching service, the process proceeds to S530; otherwise, the protection switching service 110 is a 1:1 type of protection switching service, and the process proceeds to S550.

At S530, the ePort is mapped to a multi-target ePort, such as a Layer 2 multicast group.

At S540, a multicast replication engine replicates the packet. The packet and the replication are respectively forwarded to a first ePort associated with the working path and a second ePort associated with the protection path of the protection switching service 110. Each respective replication ePort is then mapped to a logical interface and physical egress port. Physical forwarding is done based on a mapping between ePort logical interface and a physical port interface. The process then proceeds to S599 and terminates.

At S550, a target ePort is determined based on the LOC status of the working path. In an example, the network switch 101 allocates consecutive indexes, such as N and N+1 (N is an integer) of ePorts to the working path and the protection path. When no LOC is detected on the working path, the forwarding decision is to target ePort N, and when LOC is detected on the working path, the forwarding decision is to a target ePort with its least significant bit toggled. In an example, the network switch 101 uses a XOR gate to combine the index N with the entry in the LOC table 140 to calculate the index of the target ePort.

At S560, the packet is forwarded out from a physical port to which the target ePort of the forwarding decision is mapped. Then, the process proceeds to S599 and terminates.

When implemented in hardware, the hardware may comprise one or more of discrete components, an integrated circuit, an application-specific integrated circuit (ASIC), etc.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A network switch for a network communication, comprising:
    a plurality of physical ports, each physical port associated with a respective network path in a network and represented in a database of the network switch by one or more logical ports to which the each physical port is mapped;
    a detector circuit configured to detect a loss of continuity (LOC) on at least a first network path;
    a packet processor configured to:
        select, using the database, a first logical port for forwarding a packet along the first network path, the first logical port being identified by a first logical port identifier that is different from a first physical port identifier of a first physical port that is mapped to the first logical port;
        in the absence of the LOC on the first network path, forward the packet to the first physical port that is mapped to the first logical port; and
        in the presence of the LOC on the first network path, specify an alternative logical port for forwarding the packet, the alternative logical port being specified by toggling a bit in the first logical port identifier of the previously selected first logical port, without performing a lookup operation in the database for the alternative logical port, and forward the packet to a second physical port that is mapped to the alternative logical port, the second physical port being associated with an alternative network path in the network.

2. The network switch of claim 1, wherein the packet processor is further configured to assign consecutive indexes of logical ports to the first network path and a second network path respectively in a protection switching service and XOR an index of the first logical port to the first network path with an entry in a LOC table, which is indicative of a LOC detection status of the first network path, to determine a target logical port in a forwarding decision.

3. The network switch of claim 1, wherein the packet processor is further configured to use (i) first logical ports mapped to the first network path or (ii) second logical ports mapped to a second network path for forwarding the packet based in part on an entry in a LOC table that is indicative of a LOC detection status of the first network path.

4. The network switch of claim 1, wherein the packet processor is further configured to, when a protection switching service is a 1:1 protection switching service, use (i) one of first logical ports mapped to the first network path or (ii) one of second logical ports mapped to a second network path for forwarding the packet in the protection switching service to one of the first network path and the second network path.

5. The network switch of claim 1, wherein the packet processor is further configured to, when a protection switching service is a 1+1 protection switching service, use a group of logical ports for forwarding the packet to both the first network path and a second network path.

6. The network switch of claim 1, wherein the packet processor is further configured to assign a logical port mapped to a network path to the packet when the packet is received from the network path, drop the packet when an entry in a LOC table indicates that a LOC is detected on the network path to which the logical port is mapped, and transmit the packet via a protection path.

7. The network switch of claim 1, wherein the packet processor is further configured to set a path flag value indicating one of the first network path and the alternate network path as a network path associated with a physical port to which the packet is sent.

8. The network switch of claim 7, wherein the packet processor is further configured to receive the packet from the alternate network path and check whether the path flag value is consistent with an LOC detection status of the network path associated with the physical port.

9. The network switch of claim 8, wherein the packet processor is further configured to drop the packet received from the alternate network path when no LOC is detected on the first network path as indicated by the LOC detection status based on the path flag value checked.

10. A method for a network communication by a network switch, comprising:
associating each of a plurality of physical ports with a respective network path in a network and presenting the each of a plurality of physical ports in a database of the network switch by one or more logical ports to which the each physical port is mapped;
detecting a loss of continuity (LOC) on at least a first network path;
selecting, using the database, a first logical port for forwarding a packet along the first network path, the first logical port being identified by a first logical port identifier that is different from a first physical port identifier of a first physical port that is mapped to the first logical port;
in the absence of the LOC on the first network path, forwarding the packet to the first physical port that is mapped to the first logical port; and
in the presence of the LOC on the first network path, specifying an alternative logical port for forwarding the packet, the alternative logical port being by toggling a bit in the first logical port identifier of the previously selected first logical port, without performing a lookup operation in the database for the alternative logical port, and forwarding the packet to a second physical port that is mapped to the alternative logical port, the second physical port being associated with an alternative network path in the network.

11. The method of claim 10, further comprising:
assigning consecutive indexes of logical ports to the first network path and a second network path respectively in a protection switching service and XOR an index of the first logical port to the first network path with an entry in a LOC table, which is indicative of a LOC detection status of the first network path, to determine a target logical port in a forwarding decision.

12. The method of claim 10, further comprising:
using (i) first logical ports mapped to the first network path or (ii) second logical ports mapped to a second network path for forwarding the packet based in part on an entry in a LOC table that is indicative of a LOC detection status of the first network path.

13. The method of claim 10, further comprising:
when a protection switching service is a 1:1 protection switching service, using (i) one of first logical ports mapped to the first network path or (ii) one of second logical ports mapped to a second network path for forwarding the packet in the protection switching service to one of the first network path and the second network path.

14. The method of claim 10, further comprising:
when a protection switching service is a 1+1 protection switching service, using a group of logical ports for forwarding the packet to both the first network path and a second network path.

15. The method of claim 10, further comprising:
assigning a logical port mapped to a network path to the packet when the packet is received from the network path; and
dropping the packet when an entry in a LOC table indicates that a LOC is detected on the network path to which the logical port is mapped; and
transmitting the packet via a protection path.

16. The method of claim 10, further comprising:
setting a path flag value indicating one of the first network path and the alternate network path as a network path associated with a physical port to which the packet is sent.

17. The method of claim 16, further comprising:
receiving the packet from the alternate network path; and
checking whether the path flag value is consistent with an LOC detection status of the network path associated with the physical port.

18. The method of claim 17, further comprising:
dropping the packet received from the alternate network path when no LOC is detected on the first network path as indicated by the LOC detection status based on the path flag value checked.

* * * * *